(12) United States Patent
Woo et al.

(10) Patent No.: US 11,932,993 B1
(45) Date of Patent: Mar. 19, 2024

(54) COMPOSITION FOR COATING A PAPER, METHOD FOR PRODUCTION THEREOF AND COATED PAPER

(71) Applicants: SK Innovations Co., Ltd., Seoul (KR); SK Geo Centric Co., Ltd., Seoul (KR)

(72) Inventors: Dong Hyun Woo, Daejeon (KR); Sang Ha Son, Daejeon (KR); Ji Hyeon Choi, Daejeon (KR); Bu Yeon Hwang, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 0 days.

(21) Appl. No.: 18/324,478

(22) Filed: May 26, 2023

(30) Foreign Application Priority Data

Dec. 6, 2022 (KR) .................. 10-2022-0169048

(51) Int. Cl.
| | |
|---|---|
| *D21H 21/16* | (2006.01) |
| *C09D 5/00* | (2006.01) |
| *C09D 7/61* | (2018.01) |
| *C09D 7/63* | (2018.01) |
| *C09D 7/80* | (2018.01) |
| *C09D 123/08* | (2006.01) |
| *D21H 19/12* | (2006.01) |

(52) U.S. Cl.
CPC .............. *D21H 21/16* (2013.01); *C09D 5/00* (2013.01); *C09D 7/61* (2018.01); *C09D 7/63* (2018.01); *C09D 7/80* (2018.01); *C09D 123/0869* (2013.01); *D21H 19/12* (2013.01)

(58) Field of Classification Search
None
See application file for complete search history.

(56) References Cited

U.S. PATENT DOCUMENTS

2003/0119954 A1* 6/2003 Brown ............... C08L 79/00
524/514
2018/0093517 A1* 4/2018 Anil ............... C09D 123/0869

FOREIGN PATENT DOCUMENTS

| JP | 2016-041857 | 3/2016 |
| KR | 10-2014-0090163 | 7/2014 |
| KR | 10-2014-0115234 | 9/2014 |

* cited by examiner

*Primary Examiner* — Sheeba Ahmed
(74) *Attorney, Agent, or Firm* — Jones Day

(57) ABSTRACT

A paper coating composition, methods for making the same, and a coated paper. The paper coating composition comprises a solvent, an ethylene-(meth)acrylic acid copolymer, a basic compound, and a polycarbodiimide-based curing agent, wherein the polycarbodiimide-based curing agent has a carbodiimide group equivalent of about 150 to about 350. The coating of the coated paper likewise comprises an ethylene-(meth)acrylic acid copolymer crosslinked by N-acylurea groups.

16 Claims, 2 Drawing Sheets

[FIG. 1]
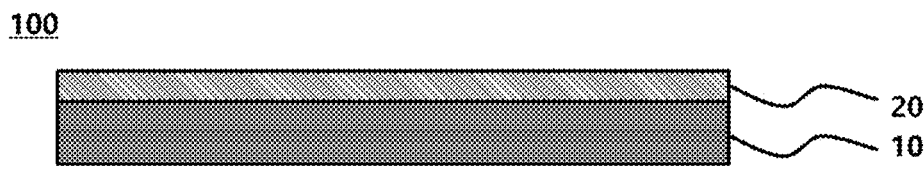
[FIG. 2]
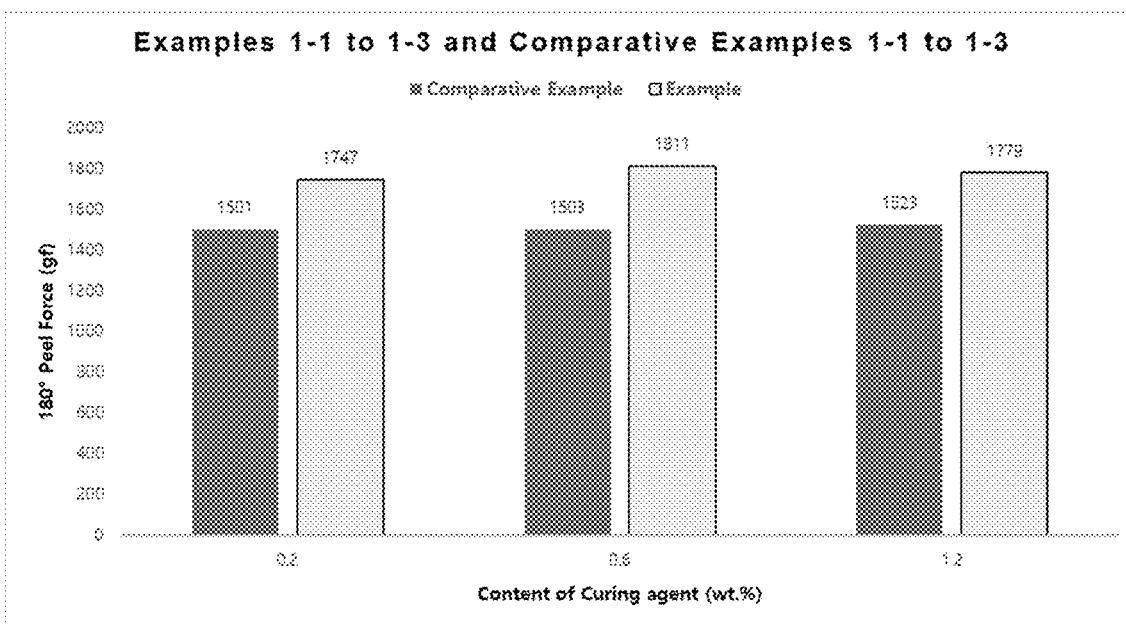

[FIG. 3]
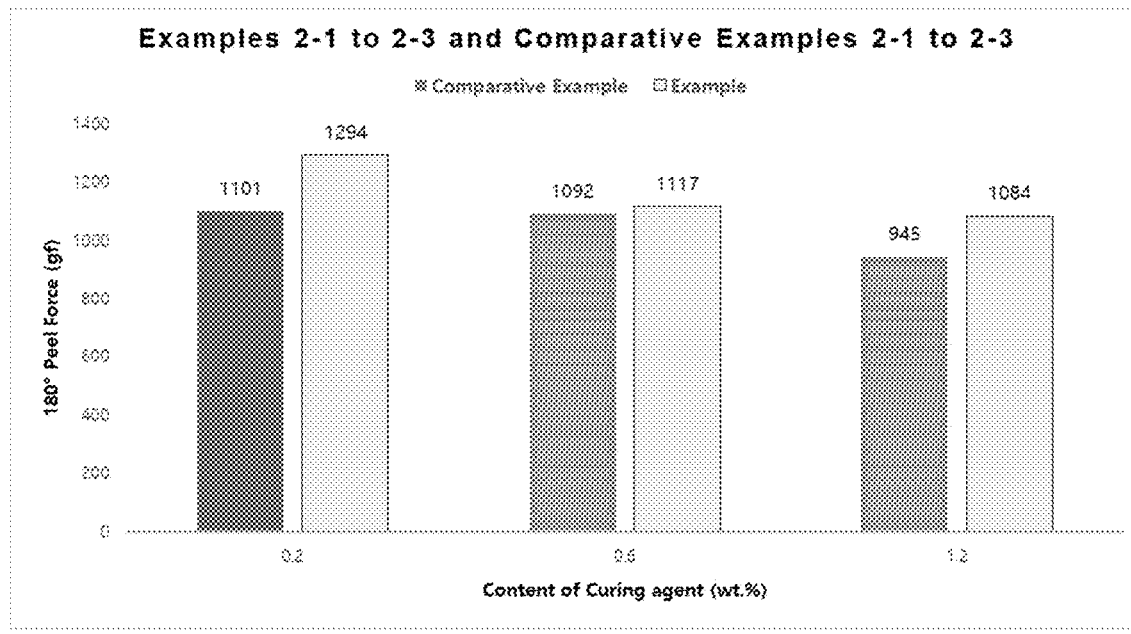

COMPOSITION FOR COATING A PAPER, METHOD FOR PRODUCTION THEREOF AND COATED PAPER

CROSS-REFERENCE TO RELATED APPLICATION

This application claims priority to Korean Patent Application No. KR 10-2022-0169048 filed on Dec. 6, 2022 in the Korean Intellectual Property Office (KIPO), the entire disclosure of which is incorporated by reference herein.

BACKGROUND OF THE INVENTION

1. Field of the Invention

The present invention relates to a composition for coating a paper, a method for making a coated paper, and a coated paper. More particularly, the present invention relates to a paper coating composition comprising a copolymer and a curing agent, a method for production thereof and a coated paper.

2. Description of the Related Art

Generally, paper products, such as food containers include paper pots, paper cups, chicken boxes, cup noodles container and the like. In this regard, in order provide durability of the paper container to moisture or oil content of food, the paper is treated to display water resistance, oil resistance, etc.

Specifically, paper food containers, such as paper cups, should have water resistance when used serve to contain water or other beverages. For this reason, paper coated with synthetic resin, in particular, commonly used resin such as PE (LDPE, HDPE) and PP, PVC, urethane resin, etc. has been used to manufacture paper food containers such as paper cups or the like.

For example, Korean Patent Laid-Open Publication No. 10-2014-0115234 discloses a method for manufacturing a paper cup by applying a coating containing ethylene-(meth)acrylic acid copolymer to the surface of the paper. However, such coated paper lacks sufficient water resistance and the manufactured paper cup is less durable than desired.

However, ethylene-(meth)acrylic acid copolymer having a low content of (meth)acrylic acid, due to cross-linking between carboxylic acids, display low polarity and thereby reduces adhesion of the coating layer to a polar substrate, such as a paper.

SUMMARY OF THE INVENTION

The present disclosure provides a composition for coating a paper having improved water resistance, a method for making a coated paper and a coated paper.

In one aspect, the present disclosure provides a composition for coating a paper ("paper coating composition"), wherein the paper coating composition comprises: a solvent; an ethylene-(meth)acrylic acid copolymer; a basic compound; and a polycarbodiimide-based curing agent, wherein the polycarbodiimide-based curing agent has a carbodiimide group equivalent about 150 to about 350, wherein carbodiimide group equivalent is the weight (g) of the curing agent based on 1 mol of carbodiimide group in the curing agent.

According to one embodiment, the carbodiimide group equivalent of the polycarbodiimide-based curing agent is about 200 to about 330.

According to one embodiment, the paper coating composition comprises more than 0% by weight (wt. %) and less than about 3 wt. % of the polycarbodiimide-based curing agent based on the total weight of the paper coating composition.

According to one embodiment, the paper coating composition comprises about 0.2 wt. % to about 1.2 wt. % of the polycarbodiimide-based curing agent based on the total weight of the paper coating composition.

According to one embodiment, the ethylene-(meth)acrylic acid copolymer in the paper coating composition comprises about 10 wt. % to about 30 wt. % of (meth)acrylic acid-derived repeat units.

According to one embodiment, the ethylene-(meth)acrylic acid copolymer in the paper coating composition may comprise about 70% to about 90% by weight of ethylene-derived repeat units.

According to one embodiment, the ethylene-(meth)acrylic acid copolymer in the paper coating composition may have a weight average molecular weight (M w) of about 10,000 to about 60,000.

According to one embodiment, the paper coating composition comprises about 10% to about 30% ethylene-(meth)acrylic acid copolymer by weight based on the total weight of the paper coating composition.

In one embodiment, the paper coating composition comprise at least one basic compound selected from the group consisting of ammonium hydroxide ($NH_4OH$), lithium hydroxide (LiOH), sodium hydroxide (NaOH), potassium hydroxide (KOH), cesium hydroxide (CsOH), and organic amine compounds.

In one embodiment, the paper coating composition comprises about 0.1% to about 5% by weight of the basic compound based on the total weight of the paper coating composition.

According to one embodiment, the solvent may comprise water.

In another aspect, the present disclosure provides a method for making a composition for coating a paper, the method comprising:
  contacting an ethylene-(meth)acrylic acid copolymer with a basic compound and a solvent to form a mixture; and
  adding to the mixture a polycarbodiimide-based curing agent to form a paper coating composition, wherein the polycarbodiimide-based curing agent has a carbodiimide group equivalent of about 150 to about 350.

According to one embodiment, the method further comprises a step of agitating the mixture at a temperature of about 100° C. to about 150° C.

According to one embodiment, the polycarbodiimide-based curing agent may be added to the mixture such that the content of the polycarbodiimide-based curing agent in the paper coating composition is more than 0% by weight and less than 3% by weight based on the total weight of the paper coating composition.

In another aspect, is the present disclosure provides a coated paper comprising: a base paper; and a coating layer formed on at least one surface of the base paper.

In one embodiment, the coating layer comprises a cross-linked ethylene-(meth)acrylic acid copolymer. In one embodiment, the coating layer comprises an ethylene-(meth)acrylic acid copolymer crosslinked by N-acylurea groups.

In one embodiment, the coating layer is formed by coating the base paper with a paper coating composition comprising a solvent, an ethylene-(meth)acrylic acid copolymer, a basic compound and a polycarbodiimide-based curing agent, wherein the polycarbodiimide-based curing agent has a carbodiimide group equivalent of about 150 to about 350.

In one embodiment, the coating layer has a thickness of about 5 μm to about 30 μm.

Without wishing to be bound by theory, it is believed that using a polycarbodiimide-based curing agent in a composition for coating a paper, as described herein, imparts improved water resistance to the paper. For example, when a composition comprising a polycarbodiimide-based curing agent is applied to a base paper, a coating layer with a smooth outer surface and low water permeation can be formed.

Therefore, when a paper container, such as a paper cup, is manufactured using a coated paper as described herein, the coated paper container may exhibit improved water resistance and the durability of the paper product may be retained or not be significantly reduced even if used for a long time. Since the period of use of the high-durability coated paper may be extended, the amount of the coated paper container consumed/discarded during the same period may be decreased, thereby resulting in reduction of greenhouse gas and environmental pollution.

Further, introduction of the polycarbodiimide-based curing agent improves manufacturing of coated paper packaging containers. For example, introduction of the polycarbodiimide-based curing agent into the paper coating composition improves adhesiveness of the paper coating composition to a polar substrate, such as the paper. Specifically, when compared to a coating created by cross-linking (meth)acrylic acid-derived repeating units in an ethylene-(meth)acrylic acid copolymer, introduction of the polycarbodiimide-based curing agent prevents reduction of polarity. Accordingly, even when the paper coating composition is applied to a base paper and then cured, the polarity is not considerably reduced, thereby improving adhesiveness of the paper coating composition to a polar substrate, for example, a paper product.

Systems and methods herein, in embodiments, efficiently provide a durable paper good that is easy to recycle, providing benefits that may include minimizing material used in manufacturing processes.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a schematic cross-sectional view illustrating a coated paper according to an embodiment of the present invention;

FIG. 2 is a graph illustrating peel-off force at a peel-off angle of 180° of paper coating compositions prepared according to Examples 1-1 to 1-3 and Comparative Examples 1-1 to 1-3; and FIG. 3 is a graph illustrating peel-off force at a peel-off angle of 180° of paper coating compositions prepared according to Examples 2-1 to 2-3 and Comparative Examples 2-1 to 2-3.

DETAILED DESCRIPTION OF THE INVENTION

The present disclosure provides a composition for coating a paper ("paper coating composition") which comprises a solvent, an ethylene-(meth)acrylic acid copolymer, a basic compound, and a polycarbodiimide-based curing agent, wherein the weight of the curing agent (in g) based on 1 mol of carbodiimide groups in the curing agent ("carbodiimide group equivalent") ranges from about 150 to about 350, as well as a method for making a coated paper. A coated paper with improved water resistance may be provided by using the paper coating composition to coat a paper as described herein.

The present disclosure also provides a coated paper, such as a coated paper product.

As used herein, paper is used to refer to any article or product comprising paper, including, but not limited to, paper containers, paper cups, paper bowls, paper plates, packaging for food or other goods, signs, tray, or any paper wherein water resistance and durability of the paper product would be advantageous.

The term "(meth)acrylic acid" used herein includes acrylic acid and methacrylic acid.

The term "about" means within 20%, within 15%, within 10%, within 9%, within 8%, within 7%, within 6%, within 5%, within 4%, within 3%, within 2%, within 1%, or less variation of a given value or range. When used to describe a temperature, the term "about" means with 5° C. (i.e., ±5° C.) of that recited temperature.

As disclosed herein, the paper coating composition comprises a polycarbodiimide-based curing agent.

The polycarbodiimide-based curing agent may have two or more carbodiimide groups and may react with a carboxyl group of the ethylene-(meth)acrylic acid copolymer according to Scheme 1 below to form an N-acylurea bond, thereby cross-linking the copolymer. Such cross-linking between ethylene-(meth)acrylic acid copolymers may result in formation of a coating layer with excellent water resistance.

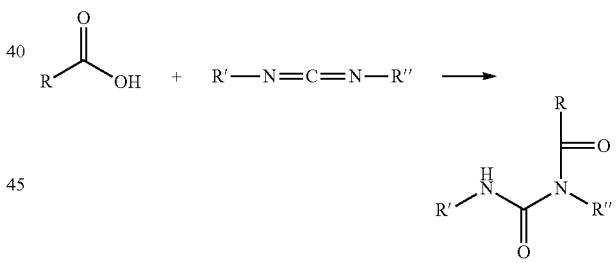

[Scheme 1]

The carbodiimide group (—N=C=N—) of the polycarbodiimide-based curing agent may have a carbodiimide group equivalent of about 150 to about 350, wherein the carbodiimide group equivalent is the weight (g) of the curing agent based on 1 mol of carbodiimide groups in the curing agent. For example, if the polycarbodiimide-based curing agent includes 10 carbodiimide groups per molecule and has a molecular weight of 3000 g/mol, the carbodiimide group equivalent of the curing agent is 300. That is, as the number of carbodiimide groups in the curing agent increases, the carbodiimide group equivalent decreases.

In some embodiments, the carbodiimide group equivalent of the polycarbodiimide-based curing agent may range from about 200 to about 330, about 200 to about 320, about 250 to about 320, about 260 to about 320, about 280 to about 320, or about 300 to about 310. When the carbodiimide group equivalent of the polycarbodiimide-based curing agent is more than about 350, adhesion to a polar substrate of the coating layer may be reduced and the resulting coating lacks water resistance. When the carbodiimide group equivalent of the polycarbodiimide-based curing agent is less than about 150, the resulting paper coating composition lacks carbodiimide groups capable of reacting with carboxyl groups of the ethylene-(meth)acrylic acid copolymer and a coating layer may not be formed and/or the coating layer itself may have inferior mechanical properties. However, when incorporating a polycarbodiimide-based curing agent having a carbodiimide group equivalent within the above ranges into a paper coating composition, a coating layer generated therefrom may display improved adhesion to a polar substrate and water resistance.

Accordingly, a coated paper having enhanced long-term durability may be provided. Even if the coated paper product is repeatedly used for a long time, less damage may occur, thereby extending use period and replacement period when compared to existing coated paper products. Therefore, the coated paper products may be produced in small quantities within a predetermined period of time and greenhouse gas emitted in manufacturing coated paper products may be reduced. In addition, the amount of the coated paper products discarded within a predetermined period may be reduced, thereby achieving environmental advantages.

Conventionally, a low density polyethylene (LDPE) is used for paper coating. However, LDPE coatings cannot be easily removed from the paper, and hence a coated paper product cannot be recycled after use thereof. Instead, the paper product is discarded in large quantities to cause a large amount of trash. The paper coating composition, as described herein, comprising an ethylene-(meth)acrylic acid copolymer allows the coating to be removed by immersing coated paper in water and grinding with a machine. Once removed, the resulting coating-free paper may be recycled and reused after drying. Accordingly, greenhouse generated in recycling of the coated paper waste may be reduced.

The polycarbodiimide-based curing agent may be an aqueous polycarbodiimide-based curing agent. The term "aqueous" used herein means water-soluble and water-dispersible. In one embodiment, the aqueous polycarbodiimide-based curing agent is a water-soluble polycarbodiimide-based curing agent or a water-dispersible polycarbodiimide-based curing agent.

The polycarbodiimide-based curing agent may be a polycarbodiimide compound or polycarbodiimide polymer. In one embodiment, the polycarbodiimide compound may contain two or more carbodiimide groups per molecule. For example, the polycarbodiimide polymer may include a carbodiimide group-containing compound and a polymer thereof, or a copolymer of the same with a monomer that can be copolymerized with the same.

Examples of carbodiimide group-containing compounds that may be used in the paper coating compositions disclosed herein include, without limitation, p-phenylene-bis (2,6-xylyl carbodiimide), tetramethylene-bis(t-butyl carbodiimide), cyclohexane-1,4-bis(methylene-t-butyl carbodiimide), 1-vinyl-3-ethyl-carbodiimide, 1-vinyl-3-propyl-carbodiimide, 1-vinyl-3-methoxypropyl-carbodiimide, 1-vinyl-3-isobutyl-carbodiimide, 1-prophenyl-3-ethyl-carbodiimide, 1-prophenyl-3-propyl-carbodiimide, 1-prophenyl-3-methoxypropyl-carbodiimide, 1-prophenyl-3-isobutyl-carbodiimide, and the like. These compounds may be used alone or in combination of two or more thereof.

Examples of monomers that can be copolymerized and may be used in the paper coating compositions disclosed herein include, without limitation, aromatic vinyl monomers such as styrene, α-methyl styrene, monochlorostyrene (e.g., 2-chlorostyrene, 3-chlorostyrene, 4-chlorostyrene), vinyl-toluene, etc.; α,β-ethylenic unsaturated mono-carboxylic acid ester monomers such as methyl acrylate, methyl methacrylate, ethyl acrylate, butyl acrylate, etc., and the like.

According to one embodiment, the content of the polycarbodiimide-based curing agent in the paper coating composition may be more than 0% by weight ("wt. %") and less than 3 wt. % based on the total weight of the paper coating composition. In one embodiment, the content of the polycarbodiimide-based curing agent in the paper coating composition may range from about 0.1 wt. % to about 2.5 wt. % or from about 0.5 wt. % to about 1.5 wt. %. When the content of the polycarbodiimide-based curing agent in the paper coating composition is within the above range, a coating layer prepared with the same may have smoothly formed surface, and a coated paper may have excellent water resistance thereby providing low water absorptivity.

According to one embodiment, the content of the polycarbodiimide-based curing agent in the paper coating composition may range from about 0.2 wt. % to about 1.2 wt. %. When the content of the polycarbodiimide-based curing agent in the paper coating composition is within the above range, the heat resistance and water resistance of a coated paper product prepared therefrom is further improved while also improving adhesion between the polar substrate and the coating layer.

As disclosed herein, the paper coating composition may comprise an ethylene-(meth)acrylic acid copolymer.

The ethylene-(meth)acrylic acid copolymer may have acidic property due to the carboxyl groups of the (meth) acrylic acid-derived units and the polarity of the copolymer may vary depending upon the content of (meth)acrylic acid-derived unit.

According to one embodiment, the ethylene-(meth) acrylic acid copolymer suitable for use in the paper coating compositions disclosed herein may comprise (meth)acrylic acid-derived repeat units in an amount of about 10 wt. % to about 30 wt. %. According to one embodiment, the ethylene-(meth)acrylic acid copolymer may comprise about 12 wt. % to about 25 wt. % of (meth)acrylic acid-derived repeat units.

Incorporating (meth)acrylic acid-derived repeat unit in a paper coating composition within the above range may provide a paper coating composition wherein the (meth) acrylic acid-derived repeat unit is dispersed well in the paper coating composition and may have improved compatibility with the polycarbodiimide-based curing agent as compared to conventionally used polymers. Further, because the ethylene-(meth)acrylic acid copolymer has high polarity, a paper coating composition comprising the ethylene-(meth) acrylic acid copolymer may have excellent wettability to a polar substrate, such as a paper surface. Therefore, when a coating layer is formed using a paper coating composition as disclosed herein, the coating layer may have smooth surface and exhibit improved physical properties.

According to one embodiment, the ethylene-(meth) acrylic acid copolymer suitable for use in the paper coating compositions disclosed herein comprise about 70 wt. % to about 90 wt. % of ethylene-derived repeat units. When the content of the ethylene-derived repeat unit in the ethylene-(meth)acrylic acid copolymer in the paper coating composition is within the above range, the coating layer prepared from the same may exhibit improved water resistance via formation of a non-polar molecular structure.

According to one embodiment, a suitable ethylene-(meth) acrylic acid copolymer for use in the disclosed paper coating compositions may have a weight average molecular weight (Mw) of about 10,000 to about 60,000. According to one embodiment, the ethylene-(meth)acrylic acid copolymer may have a weight average molecular weight (Mw) of about 10,000 to about 40,000 or about 20,000 to about 40,000.

In one embodiment, the ethylene-(meth)acrylic acid copolymer may include two or more ethylene-(meth)acrylic acid copolymers, each having different weight average molecular weights. For example, the ethylene-(meth)acrylic acid copolymer may include a first ethylene-(meth)acrylic acid copolymer having a weight average molecular weight of about 15,000 to about 25,000, and a second ethylene-(meth)acrylic acid copolymer having a weight average molecular weight of more than about 25,000 and less than about 35,000.

In some embodiments, the ethylene-(meth)acrylic acid copolymer may have a polydispersity index of about 2 to about 5 or about 2.5 to about 4.

According to one embodiment, the content of the ethylene-(meth)acrylic acid copolymer in the paper coating composition may range from about 10 wt. % to about 30 wt. % based on the total weight of the paper coating composition. In some embodiments, the content of the ethylene-(meth) acrylic acid copolymer may range from about 15 wt. % to about 25 wt. % or about 18 wt. % to about 23 wt. % based on the total weight of the paper coating composition.

When the content of the ethylene-(meth)acrylic acid copolymer in the paper coating composition is within the above range, the viscosity of the paper coating composition may be suitably adjusted to form a coating layer with a sufficient thickness on the paper.

In some embodiments, the melting temperature (Tm) of ethylene-(meth)acrylic acid copolymers that may be used in the paper coating compositions disclosed herein may range from about 50° C. to about 100° C. In some embodiments, the melting temperature of an ethylene-(meth)acrylic acid copolymer suitable for use in the paper coating compositions disclosed herein may range from about 60° C. to about 85° C., or about 70° C. to about 80° C. Advantageously, a paper coating composition comprising the ethylene-(meth)acrylic acid copolymer with a melting point in this range may form a coating layer at a relatively low temperature (e.g., room temperature).

As disclosed herein, the paper coating composition may comprise a basic compound. According to one embodiment, the basic compound may comprise at least one compound selected from the group consisting of ammonium hydroxide ($NH_4OH$), lithium hydroxide (LiOH), sodium hydroxide (NaOH), potassium hydroxide (KOH), cesium hydroxide (CsOH), and organic amine compounds. In one embodiment, the basic compound is ammonium hydroxide, which may be in the form of ammonia water.

The basic compound may cause an acid-base neutralization reaction with the carboxyl group of the (meth)acrylic acid-derived unit in the ethylene-(meth)acrylic acid copolymer, thereby neutralizing the carboxyl groups and increase dispersibility of the ethylene-(meth)acrylic acid copolymer.

According to one embodiment, the content of the basic compound in the paper coating composition may range from about 0.1 wt. % to about 5 wt. % based on the total weight of the paper coating composition. In some embodiments, the content of the basic compound may range from about 0.1% to about 3 wt. %, or about 0.2 wt. % to about 2 wt. % based on the total weight of the paper coating composition.

When the content of the basic compound in the paper coating composition is within the above range, the carboxyl groups may be sufficiently neutralized thereby improving the dispersibility of the ethylene-(meth)acrylic acid copolymer, while, at the same time, enabling the coating composition to have a desirable viscosity.

According to one embodiment, the content of the basic compound may be determined based upon the content of the (meth)acrylic acid-derived unit in the ethylene-(meth) acrylic acid copolymer. For example, if the content of the (meth)acrylic acid-derived unit in the ethylene-(meth) acrylic acid copolymer is higher, a larger amount of basic compound may be used.

The paper coating composition disclosed herein may further include a solvent. The solvent may function as a solvent and/or as a dispersion medium for the ethylene-(meth)acrylic acid copolymer, basic compound, and polycarbodiimide-based curing agent.

In one embodiment, the solvent comprises water. In one embodiment, the water is pure water or deionized water.

According to one embodiment, the solvent may be included in the paper coating composition to balance the ethylene-(meth)acrylic acid copolymer, the basic compound and the polycarbodiimide-based curing agent in the paper coating composition.

The paper coating compositions disclosed herein are dispersions comprising solid content and liquid content. The solid content in the paper coating composition may range from about 5 wt. % to about 40 wt. % based on the total weight of the paper coating composition. In some embodiments, the solid content of the paper coating composition may range from about 10 wt. % to about 40 wt. %, or about 20 wt. % to about 30 wt. % based on the total weight of the paper coating composition. The balance of the paper coating composition (e.g., liquid content) may be solvent, e.g., water.

When the solid content of the paper coating composition is within the above range, the paper coating composition may have a desirable viscosity and may result in a coating layer that is smooth with improved physical properties.

According to one embodiment, the paper coating composition does not include any additional component other than the ethylene-(meth)acrylic acid copolymer, the basic compound, the polycarbodiimide-based curing agent, and the solvent as the balance. That is, in one embodiment, the paper coating composition consists of the ethylene-(meth)acrylic acid copolymer, the basic compound, the polycarbodiimide-based curing agent, and the solvent as the balance. In one embodiment, the paper coating composition consists essentially of the ethylene-(meth)acrylic acid copolymer, the basic compound, the polycarbodiimide-based curing agent, and the solvent as the balance.

In one embodiment, the solvent in the paper coating composition is not an organic solvent. The coating layer may be formed by evaporating the solvent for example, water only, in the paper coating composition, thereby providing a simple process for manufacturing the coated paper.

According to one embodiment, the viscosity at room temperature of the paper coating composition may be about 1,000 cP or less. At this viscosity, the paper coating composition may be uniformly applied to a paper surface, including a paper having uneven portions or surfaces. In one embodiment, the viscosity of the paper coating composition may range from about 300 cP to about 700 cP, or about 400 cP to about 500 cP.

According to another aspect, the present disclosure provides a method of making a paper coating composition, the method comprising:

contacting an ethylene-(meth)acrylic acid copolymer with a basic compound and a solvent to form a mixture; and adding a polycarbodiimide-based curing agent to the mixture to form the paper coating composition, wherein the carbodiimide group equivalent of the curing agent ranges from about 150 to about 350.

The ethylene-(meth)acrylic acid copolymer, the basic compound, and the solvent may be as described according to any embodiment disclosed herein.

In one embodiment, the ethylene-(meth)acrylic acid copolymer that is contacted with the basic compound and a solvent may be in the form of a solid, rather than, e.g., a dispersion. In one embodiment, the basic compound may be used in the form of an aqueous solution.

The total solvent content of the paper coating composition may be the sum of the amount of the solvent from the aqueous basic compound solution and the amount of separately added solvent.

The content of the ethylene-(meth)acrylic acid copolymer in the mixture may range from about 10 wt. % to about 30 wt. % based on a total weight of the mixture. When the content of the ethylene-(meth)acrylic acid copolymer in the paper coating composition is within the above range, the resulting viscosity of the paper coating composition prepared therefrom may form a coating layer with a sufficient thickness on the paper.

The content of the basic compound in the paper coating composition may range from about 0.1 wt. % to about 5 wt. % based on the total weight of the paper coating composition. When the content of the basic compound in the paper coating composition is within the above range, the carboxyl groups may be sufficiently neutralized to provide desired dispersibility of the ethylene-(meth)acrylic acid copolymer in the paper coating composition, while also providing a paper coating composition having a desired viscosity.

One of skill in the art will understand that the amount of the basic compound solution may be varied depending upon the content of acrylic acid in the ethylene-(meth)acrylic acid copolymer, the type of the basic compound, and the concentration of the basic compound.

For example, in one embodiment, the basic compound solution may be used in an amount of about 5 to about 30 parts by weight ("wt. parts") based on 100 wt. parts of the ethylene-(meth)acrylic acid copolymer.

The mixture may be prepared by contacting ethylene-(meth)acrylic acid copolymer, e.g., as a solid, with the basic compound, e.g., as a solution to disperse basic compound within the copolymer.

According to one embodiment, the mixture may be agitated at an elevated temperature, such as at a temperature of about 100° C. to about 150° C. At this temperature, the neutralization reaction between the ethylene-(meth)acrylic acid copolymer and the basic compound may be accelerated, and the at least partially neutralized ethylene-(meth)acrylic acid copolymer and un-neutralized ethylene-(meth)acrylic acid copolymer may be effectively dispersed in the solvent. In some embodiments, the agitation may be conducted at a temperature of about 110° C. to about 140° C. or about 110° C. to about 120° C.

In one embodiment, the agitation may be conducted at a rate of about 200 rpm to about 1,000 rpm for about 1 hour to about 20 hours. In some embodiments, the agitation may be conducted at a rate of about 300 rpm to about 500 rpm for about 2 hours to about 16 hours.

A polycarbodiimide-based curing agent, wherein the carbodiimide group equivalent ranges from about 150 to about 350, may then be added to the mixture to form the paper coating composition.

The polycarbodiimide-based curing agent may be as described according to any embodiment disclosed herein.

In one embodiment, the polycarbodiimide-based curing agent is added such that the content of polycarbodiimide-based curing agent in the paper coating composition is more than 0 wt. % and less than 3 wt. % based on the total weight of the paper coating composition. In one embodiment, the polycarbodiimide-based curing agent is added such that the content of polycarbodiimide-based curing agent in the paper coating composition is about 0.1 wt. % to about 2.5 wt. %, or about 0.5 wt. % to about 1.5 wt. % based on the total weight of the paper coating composition.

When the content of the polycarbodiimide-based curing agent in the paper coating composition is within the above range, the surface of a coating layer prepared therefrom may be smooth, while providing the coated paper with excellent water resistance and thus low absorptivity.

In one embodiment, the polycarbodiimide-based curing agent is added such that the content of polycarbodiimide-based curing agent in the paper coating composition is about 0.2 wt. % to about 1.2 wt. %. When the content of the polycarbodiimide-based curing agent in the paper coating composition is within the above range, the heat resistance and water resistance of the coated paper may be further enhanced while improving adhesion between the polar substrate and the coating layer.

The polycarbodiimide-based curing agent may be added to the mixture in the form of a water-dispersion. In one embodiment, the polycarbodiimide-based curing agent is be added in the form of dispersion in water. In one embodiment, the dispersion in water, which is added to the mixture, has a solid content of about 30 wt. % to about 50 wt. %.

The total solvent content in the paper coating composition is the sum of an amount of the solvent from the basic compound solution, the solvent in the polycarbodiimide-based curing agent water-dispersion, and the amount of separately added solvent.

FIG. 1 is a schematic cross-sectional view illustrating one embodiment of a coated paper as described herein. In FIG. 1, a coated paper 100 may include a base paper 10 and a coating layer 20 formed on at least one surface of the base paper 10.

The coating layer 20 may be formed by contacting the base paper 10 with a paper coating composition, wherein the paper coating composition comprises a solvent, an ethylene-(meth)acrylic acid copolymer, a basic compound, and a polycarbodiimide-based curing agent, wherein the polycarbodiimide-based curing agent has a carbodiimide group equivalent of about 150 to about 350.

In one embodiment, the paper coating composition is applied to the base paper, followed by drying the same to produce the coated paper.

In one embodiment, the coating layer of the coated paper may have a thickness of about 5 μm to about 30 μm. When the thickness of the coating layer is within the above range, permeation of water to the base paper may be prevented. In some embodiments, the coating layer of the coated paper may have a thickness of about 10 μm to about 20 μm.

Hereinafter, with reference to specific experimental examples, examples of the present invention will be additionally described. However, the examples and comparative examples included in the experimental examples are provided for illustrative purpose only but are not intended to limit the appended claims.

Example 1-1

To a 2000 mL auto-clave device, 100 g of ethylene-acrylic acid copolymer (PRIMACOR 5980i (content of acrylic acid:

20.5 wt. %)), 15 g of ammonia water (NH$_4$: 15 wt. %) and 352.041 g of water were added, followed by agitating the mixture at a temperature of 110° C. at an agitation rate of 400 rpm for 2 hours.

To the mixture, a polycarbodiimide-based curing agent (2.347 g of carbodilite E-05 of Nitshinbo Co. (water-dispersion having a carbodiimide group equivalent of 310 and a solid content of 40 wt. %)) was added to produce a paper coating composition.

With regard to a total weight of the produced paper coating composition, the content of the copolymer was about 21.30 wt. %, the content of the basic compound was about 0.47 wt. %, the content of the curing agent was about 0.20 wt. %, and the balance was water (including water portions of the ammonia water and the curing agent water-dispersion).

Example 1-2

A paper coating composition was produced by the same procedure as in Example 1-1 except that, in the preparation of a mixture, 367.02 g of water was admixed and 7.340 g of the curing agent was added to the mixture.

At this time, with regard to a total weight of the produced paper coating composition, the content of the copolymer was about 20.43 wt. %, the content of the basic compound was about 0.46 wt. %, the content of the curing agent was about 0.60 wt. %, and the balance was water (including water portions of the ammonia water and the curing agent water-dispersion).

Example 1-3

A paper coating composition was produced by the same procedure as in Example 1-1 except that, in the preparation of a mixture, 392.046 g of water was admixed and 15.682 g of the curing agent was added to the mixture.

At this time, with regard to a total weight of the produced paper coating composition, the content of the copolymer was about 19.13 wt. %, the content of the basic compound was about 0.43 wt. %, the content of the curing agent was about 1.20 wt. %, and the balance was water (including water portions of the ammonia water and the curing agent water-dispersion).

Example 2-1

To a 1500 mL auto-clave device, 100 g of ethylene-(meth) acrylic acid copolymer (XUS 60758.10L of SK PRIMACOR Co. (Lab grade) (content of acrylic acid: 13.5 wt. %)), 11.25 g of sodium hydroxide solution (NaOH: 11.25 wt. %) and 340.560 g of water were added, followed by agitating the mixture at a temperature of 110° C. at an agitation rate of 400 rpm for 2 hours, thereby preparing a mixture.

To the mixture, a polycarbodiimide-based curing agent (2.270 g of carbodilite E-05 of Nitshinbo Co. (water-dispersion having a carbodiimide group equivalent of 310 and a solid content of 40 wt. %)) was added to produce a paper coating composition.

With regard to the total weight of the produced paper coating composition, the content of the copolymer was about 22.02 wt. %, the content of the basic compound was about 0.28 wt. %, and the content of the curing agent was about 0.20 wt. %, and the balance was water (including water portions of the sodium hydroxide solution and the curing agent water-dispersion).

Example 2-2

A paper coating composition was produced by the same procedure as in Example 2-1 except that, in the preparation of a mixture, 355.053 g of water was admixed and 7.101 g of the curing agent was added to the mixture.

At this time, with regard to a total weight of the produced paper coating composition, a content of the copolymer was about 21.12 wt. %, a content of the basic compound was about 0.27 wt. %, a content of the curing agent was about 0.60 wt. %, and the balance was water (including water portions of the sodium hydroxide solution and the curing agent water-dispersion).

Example 2-3

A paper coating composition was produced by the same procedure as in Example 2-1 except that, in the preparation of a mixture, 379.260 g of water was admixed and 15.170 g of the curing agent was added to the mixture.

With regard to a total weight of the produced paper coating composition, the content of the copolymer was about 19.77 wt. %, the content of the basic compound was about 0.25 wt. %, the content of the curing agent was about 1.20 wt. %, and the balance was water (including water portion of the sodium hydroxide solution and the curing agent water-dispersion).

Comparative Examples 1-1 to 1-3

Each paper coating composition was produced by the same procedure as described in Examples 1-1 to 1-3, except that, as a curing agent, carbodilite V-02-L2 of Nitshinbo Co. (water-dispersion having a carbodiimide group equivalent of 385 and a solid content of 40 wt. %) was added.

Comparative Examples 2-1 to 2-3

Each paper coating composition was produced by the same procedure as described in Examples 2-1 to 2-3, except that, as a curing agent, carbodilite V-02-L2 of Nitshinbo Co. (water-dispersion having a carbodiimide group equivalent of 385 and a solid content of 40 wt. %) was added.

Reference Example 1

To a 2000 mL auto-clave device, 100 g of ethylene-acrylic acid copolymer (PRIMACOR 5980i (content of acrylic acid: 20.5 wt. %)), 15 g of ammonia water (NH$_4$: 15 wt. %) and 345 g of water were added, followed by agitating the mixture at a temperature of 110° C. and an agitation rate of 400 rpm for 2 hours, thereby producing a paper coating composition.

With regard to the total weight of the produced paper coating composition, the content of the copolymer was about 21.74 wt. %, the content of the basic compound was about 0.49 wt. %, and the balance was water (including water portions of the ammonia water and the curing agent water-dispersion).

Reference Example 2

To a 1500 mL of auto-clave device, 100 g of ethylene-acrylic acid copolymer (XUS 60758.10L of SK PRIMACOR Co. (Lab grade) (content of acrylic acid: 13.5 wt. %)), 11.25 g of sodium hydroxide solution (NaOH: 11.25 wt. %) and 333.75 g of water were added, followed by agitating the mixture at a temperature of 110° C. and an agitation rate of 400 rpm for 2 hours to produce a paper coating composition.

With regard to the total weight of the produced paper coating composition, the content of the copolymer was about 22.47 wt. %, the content of the basic compound was about 0.28 wt. %, and the balance was water (including water portions of the sodium hydroxide solution and the curing agent water-dispersion).

TABLE 1 shows the summary of characteristics and contents of the coating components in the examples, comparative examples and reference examples.

TABLE 1

| Wt. % among total weight of composition | Basic compound | | EAA copolymer | | Curing agent | |
|---|---|---|---|---|---|---|
| | Type | Content | Acrylic acid content (wt. %) | Content | —N=C=N— equivalent | Content |
| Example 1-1 | NH$_4$ | 0.47 | 20.5 | 21.30 | 310 | 0.2 |
| Example 1-2 | NH$_4$ | 0.46 | 20.5 | 20.43 | | 0.6 |
| Example 1-3 | NH$_4$ | 0.43 | 20.5 | 19.13 | | 1.2 |
| Comparative Example 1-1 | NH$_4$ | 0.47 | 20.5 | 21.30 | 385 | 0.2 |
| Comparative Example 1-2 | NH$_4$ | 0.46 | 20.5 | 20.43 | | 0.6 |
| Comparative Example 1-3 | NH$_4$ | 0.43 | 20.5 | 19.13 | | 1.2 |
| Reference Example 1 | NH$_4$ | 0.49 | 20.5 | 21.74 | — | 0 |
| Example 2-1 | NaOH | 0.28 | 13.5 | 22.02 | 310 | 0.2 |
| Example 2-2 | NaOH | 0.27 | 13.5 | 21.12 | | 0.6 |
| Example 2-3 | NaOH | 0.25 | 13.5 | 19.77 | | 1.2 |
| Comparative Example 2-1 | NaOH | 0.28 | 13.5 | 22.02 | 385 | 0.2 |
| Comparative Example 2-2 | NaOH | 0.27 | 13.5 | 21.12 | | 0.6 |
| Comparative Example 2-3 | NaOH | 0.25 | 13.5 | 19.77 | | 1.2 |
| Reference Example 2 | NaOH | 0.28 | 13.5 | 22.47 | — | 0 |

In TABLE 1 above, EAA copolymer means the ethylene-acrylic acid copolymer, the acrylic acid content is a value of the content of acrylic acid-derived repeat unit in units of wt. % with reference to the whole of copolymer, and each content of the curing agent, basic compound and copolymer is a value in units of wt. % with reference to the whole of paper coating composition.

Experimental Example 1: Assessment of Water Resistance of Coated Paper

The paper coating composition in each of the examples, comparative examples and reference examples was applied to a base paper for a paper cup to form a coating layer with a thickness of 10 μm, followed by drying the same to produce a coated paper.

According to ISO-533, the base paper for a paper cup and the produced coated paper were assessed for water resistance. Specifically, each of the base paper for a paper cup and the coated paper was cut to have the same area of 100 cm 2 (0.01 m$^2$), followed by measuring weight (g) in dried state. Each of the base paper for a paper cup and the coated paper was treated with water and then measured for a weight (g) in wet state according to ISO-533. Absorptivity was calculated from the measured weight by the following Equation 1, and results thereof are shown in TABLE 2 in Experimental Example 2.

$$\text{Absorptivity} = (\text{Wet weight} - \text{Dry weight})/\text{Specimen area} \quad [\text{Equation 1}]$$

Experimental Example 2: Assessment of Adhesiveness to Polar Substrate

The paper coating composition in each of the examples, comparative examples and reference examples was applied to an aluminum (Al) substrate (thickness: 40 μm) in order to form a coating layer with a thickness of 10 μm, followed by drying the same to prepare a sample. For the prepared sample, a peel-off force for the coating layer was measured at a peel-off rate of 20 mm/min and at room temperature by UTM (Universal Testing Machine, 5956) apparatus of INSTRON Co., and the measured results are shown in TABLE 2 below.

Further, FIG. 2 shows a graph for peel-off forces (i.e., peel-off strength) at a peel-off angle of 180° according to contents of the curing agents in Examples 1-1 to 1-3 and Comparative Examples 1-1 to 1-3, while FIG. 3 shows a graph for peel-off forces at a peel-off angle of 180° according to contents of the curing agents in Examples 2-1 to 2-3 and Comparative Examples 2-1 to 2-3.

TABLE 2

| | Dry weight (g) | Wet weight (g) | Absorptivity (g/m$^2$) | Peel-off force at 180° (gf/in) |
|---|---|---|---|---|
| Example 1-1 | 3.64 | 3.66 | 2 | 1747 |
| Example 1-2 | 3.71 | 3.72 | 1 | 1811 |
| Example 1-3 | — | — | — | 1779 |
| Comparative Example 1-1 | 3.68 | 3.73 | 5 | 1501 |
| Comparative Example 1-2 | 3.72 | 3.76 | 4 | 1503 |
| Comparative Example 1-3 | — | — | — | 1523 |
| Reference | 3.58 | 3.66 | 4 | 1609 |

TABLE 2-continued

| | Dry weight (g) | Wet weight (g) | Absorptivity (g/m$^2$) | Peel-off force at 180° (gf/in) |
|---|---|---|---|---|
| Example 1 | | | | |
| Example 2-1 | 3.71 | 3.77 | 6 | 1294 |
| Example 2-2 | 3.75 | 3.77 | 2 | 1117 |
| Example 2-3 | — | — | — | 1084 |
| Comparative Example 2-1 | 3.63 | 3.73 | 10 | 1101 |
| Comparative Example 2-2 | 3.62 | 3.71 | 9 | 1092 |
| Comparative Example 2-3 | — | — | — | 945 |
| Reference Example 2 | 3.62 | 3.82 | 20 | 1324 |
| Base paper | 3.5 | 4.22 | 77 | — |

Referring to TABLE 2, FIGS. 2 and 3, it can be confirmed that the coated papers according to the examples have low absorptivity and thus improved water resistance. Further, it can also be confirmed that the paper coating compositions according to the examples have peel-off force to a polar substrate, which is higher than or similar to those of the reference examples.

On the other hand, the comparative examples where carbodiimide curing agents having a carbodiimide group equivalent of more than 350 were used showed higher water absorptivity than the water absorptivity of the examples and thus some deterioration of water resistance. Further, it can be confirmed that the paper coating composition according to each of the comparative examples has lower peel-off force to a polar substrate than the examples, in which the same amount of curing agent was added, and the peel-off force is much less than those in the reference examples.

What is claimed is:

1. A composition for coating a paper comprising:
   a solvent;
   an ethylene-(meth)acrylic acid copolymer;
   a basic compound; and
   a polycarbodiimide-based curing agent,
   wherein the polycarbodiimide-based curing agent has a carbodiimide group equivalent of about 150 to about 350, and
   wherein the carbodiimide group equivalent is the weight (g) of the curing agent based on 1 mol of carbodiimide groups in the curing agent.

2. The composition for coating a paper according to claim 1, wherein the carbodiimide group equivalent of the polycarbodiimide-based curing agent is about 200 to about 330.

3. The composition for coating a paper according to claim 1, wherein the composition comprises more than 0 wt. % and less than about 3 wt. % of the polycarbodiimide-based curing agent based on the total weight of the composition.

4. The composition for coating a paper according to claim 1, wherein the composition comprises about 0.2 wt. % to about 1.2 wt. % of the polycarbodiimide-based curing agent based on the total weight of the composition.

5. The composition for coating a paper according to claim 1, wherein the ethylene-(meth)acrylic acid copolymer comprises about 10 wt. % to about 30 wt. % of (meth)acrylic acid-derived repeat units.

6. The composition for coating a paper according to claim 1, wherein the ethylene-(meth)acrylic acid copolymer comprises about 70 wt. % to about 90 wt. % by weight of ethylene-derived repeat units.

7. The composition for coating a paper according to claim 1, wherein the ethylene-(meth)acrylic acid copolymer has a weight average molecular weight (Mw) of about 10,000 to about 60,000.

8. The composition for coating a paper according to claim 1, wherein the composition comprises about 10 wt. % to about 30 wt. % of the ethylene-(meth)acrylic acid copolymer based on a total weight of the composition.

9. The composition for coating a paper according to claim 1, wherein the basic compound comprises at least one basic compound selected from the group consisting of ammonium hydroxide ($NH_4OH$), lithium hydroxide (LiOH), sodium hydroxide (NaOH), potassium hydroxide (KOH), cesium hydroxide (CsOH), and organic amine compounds.

10. The composition for coating a paper according to claim 1, wherein the composition comprises about 0.1 wt. % to about 5 wt. % of the basic compound based on the total weight of the composition.

11. The composition for coating a paper according to claim 1, wherein the solvent comprises water.

12. A method of making a composition for coating a paper, the method comprising:
   contacting an ethylene-(meth)acrylic acid copolymer with a basic compound and a solvent to form a mixture; and
   adding to the mixture a polycarbodiimide-based curing agent to make the composition for coating a paper, wherein the polycarbodiimide-based curing agent has a carbodiimide group equivalent of about 150 to about 350,
   wherein the carbodiimide group equivalent is the weight (g) of the curing agent based on 1 mol of carbodiimide groups in the curing agent.

13. The method according to claim 12, further comprising the step of agitating the mixture at a temperature of about 100° C. to about 150° C.

14. The method according to claim 12, wherein the polycarbodiimide-based curing agent is added to the mixture such that the content of the polycarbodiimide-based curing agent is more than 0 wt. % and less than 3 wt. % based on the total weight of the paper coating composition.

15. A coated paper, comprising:
   a base paper; and
   a coating layer formed on at least one surface of the base paper,
   wherein the coating layer is formed by coating the base paper with a composition for coating a paper which comprises a solvent, an ethylene-(meth)acrylic acid copolymer, a basic compound and a polycarbodiimide-based curing agent, wherein the polycarbodiimide-based curing agent has a carbodiimide group equivalent of about 150 to about 350,
   wherein carbodiimide group equivalent is the weight (g) of the curing agent based on 1 mol of carbodiimide group.

16. The coated paper according to claim 15, wherein the coating layer has a thickness of about 5 μm to about 30 μm.

* * * * *